W. GRAHAM.
CONVEYER.
APPLICATION FILED OCT. 22, 1910.
1,039,730.
Patented Oct. 1, 1912.
9 SHEETS—SHEET 4.
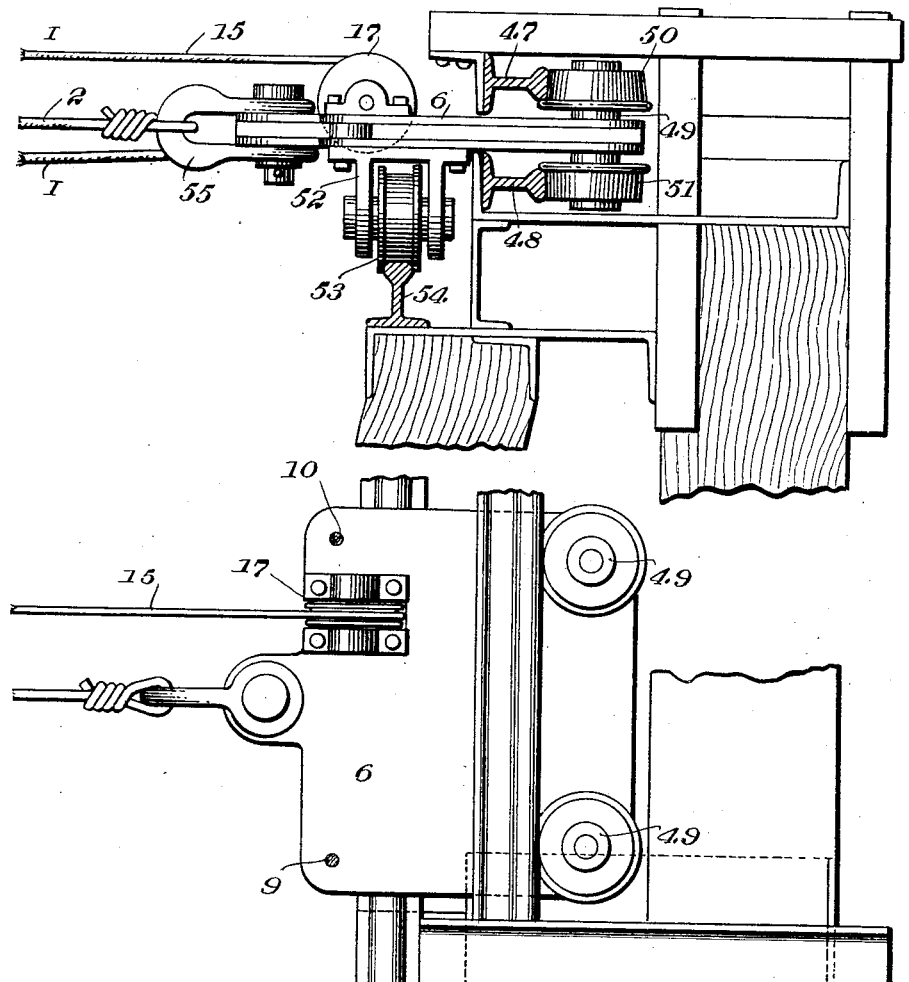
Fig. 5.
Fig. 6.
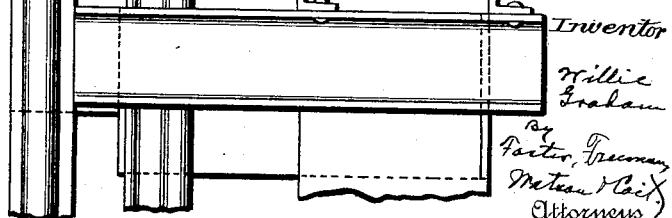

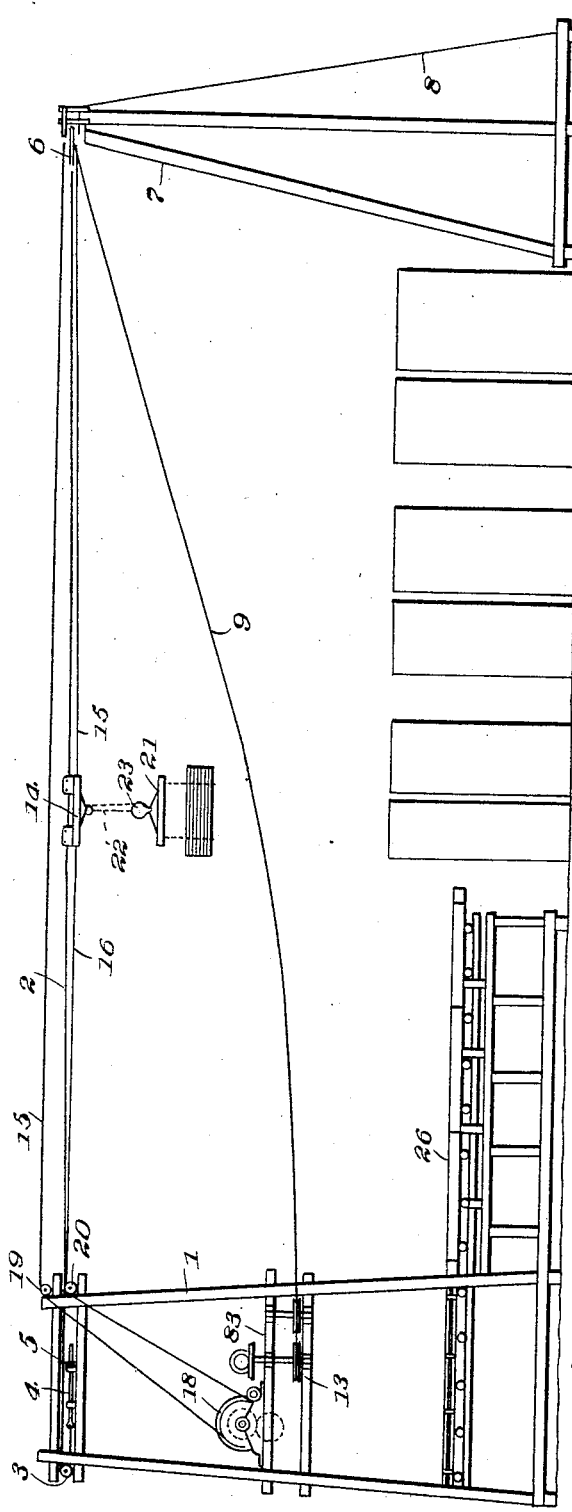

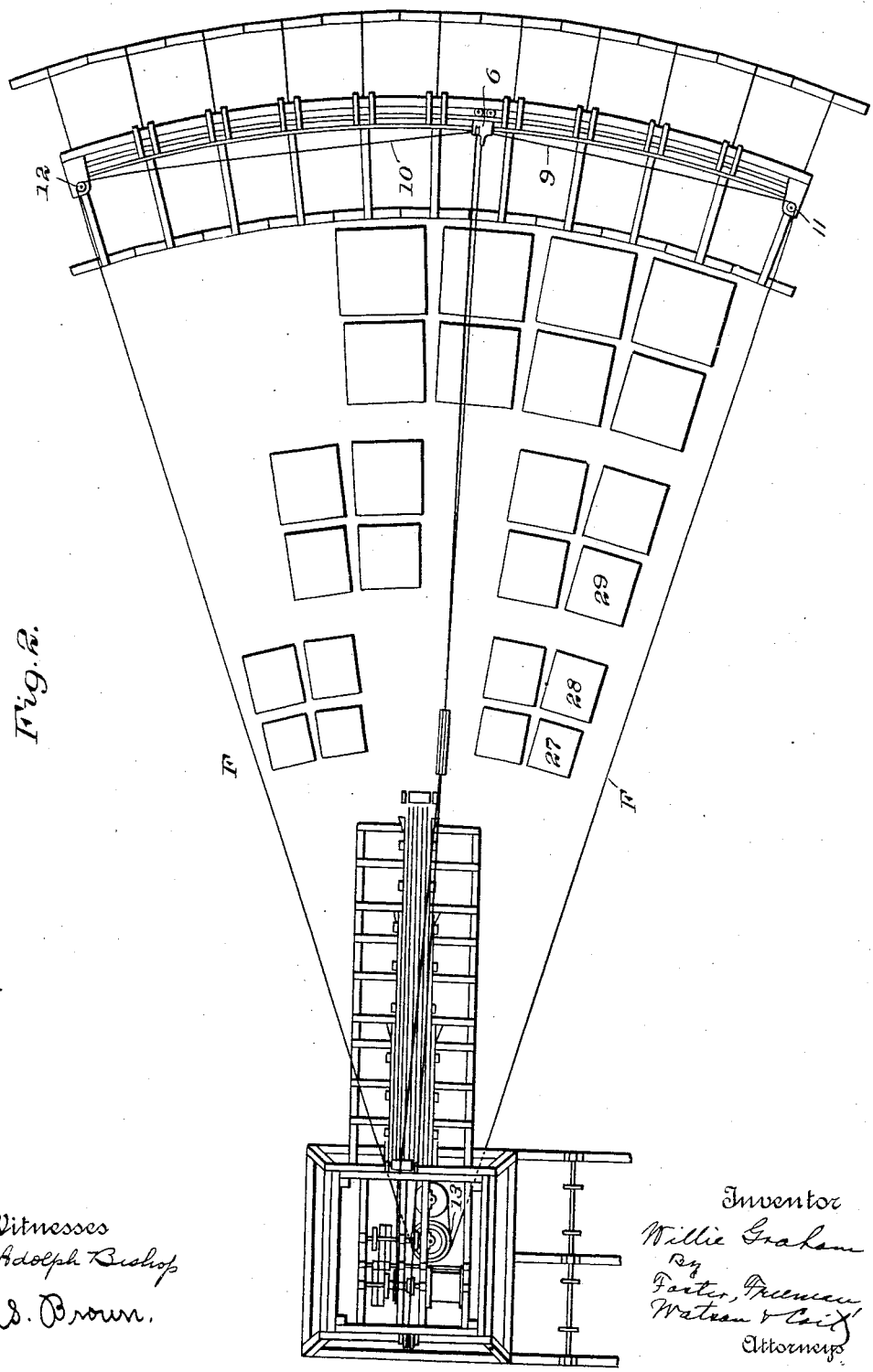

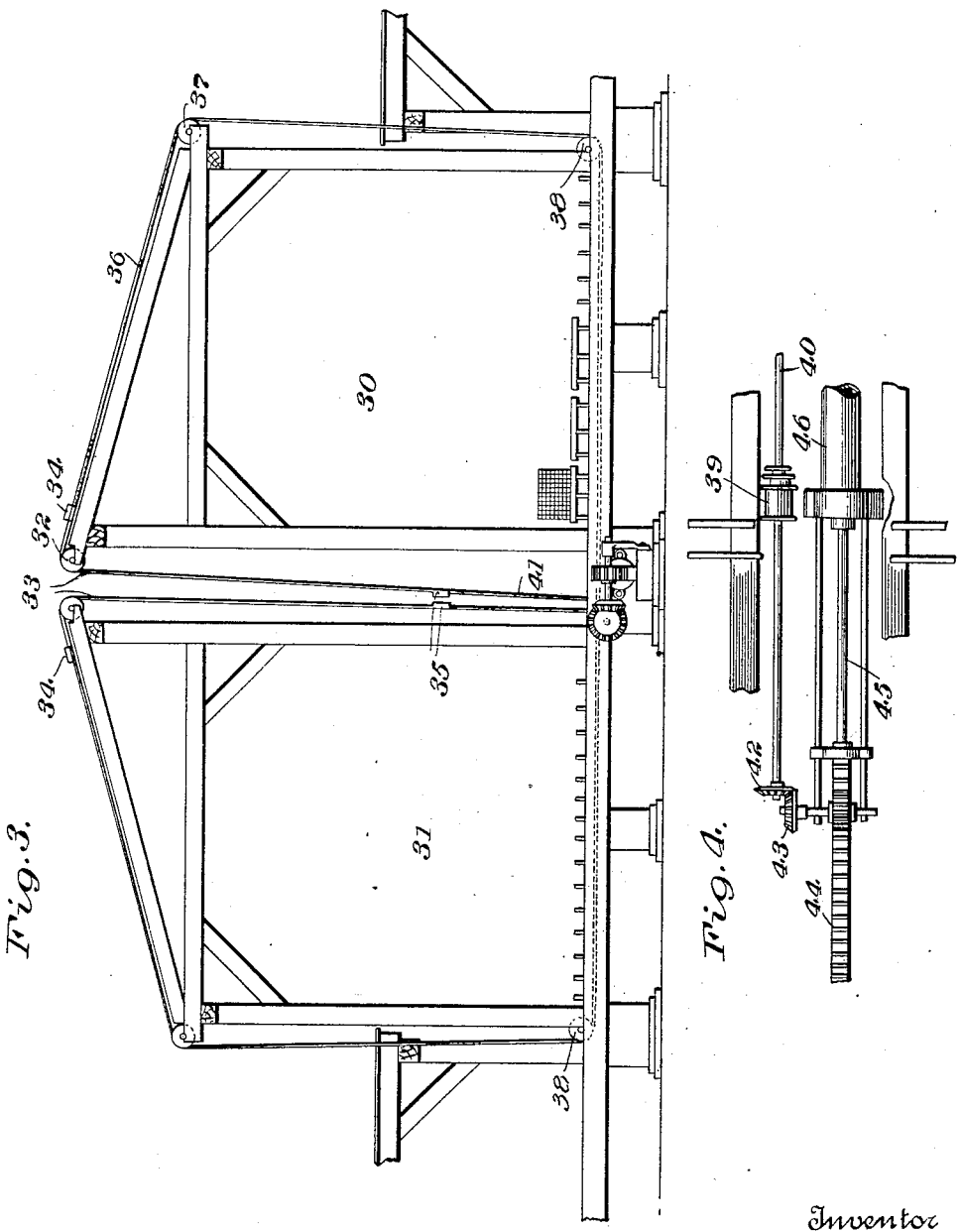

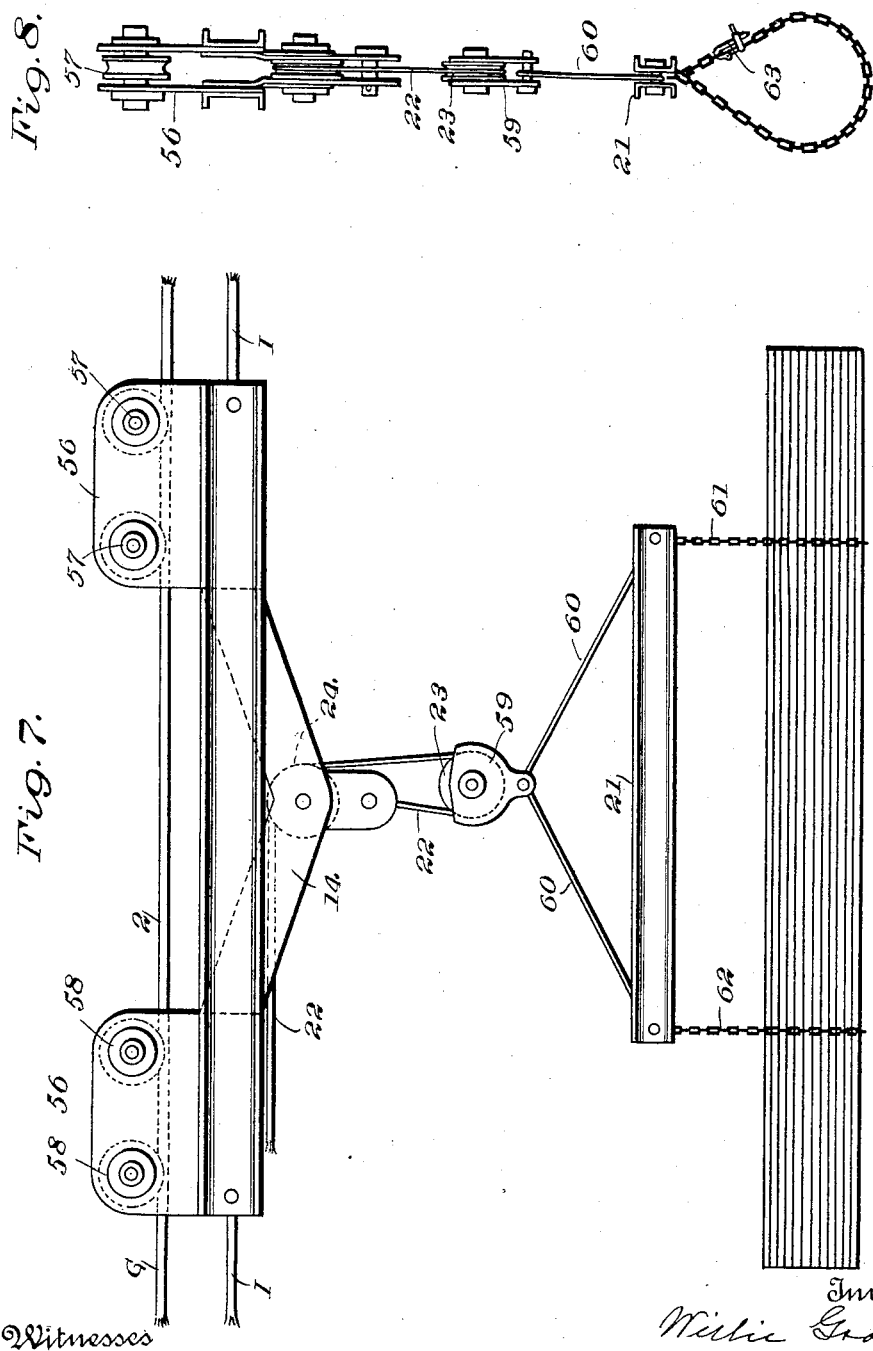

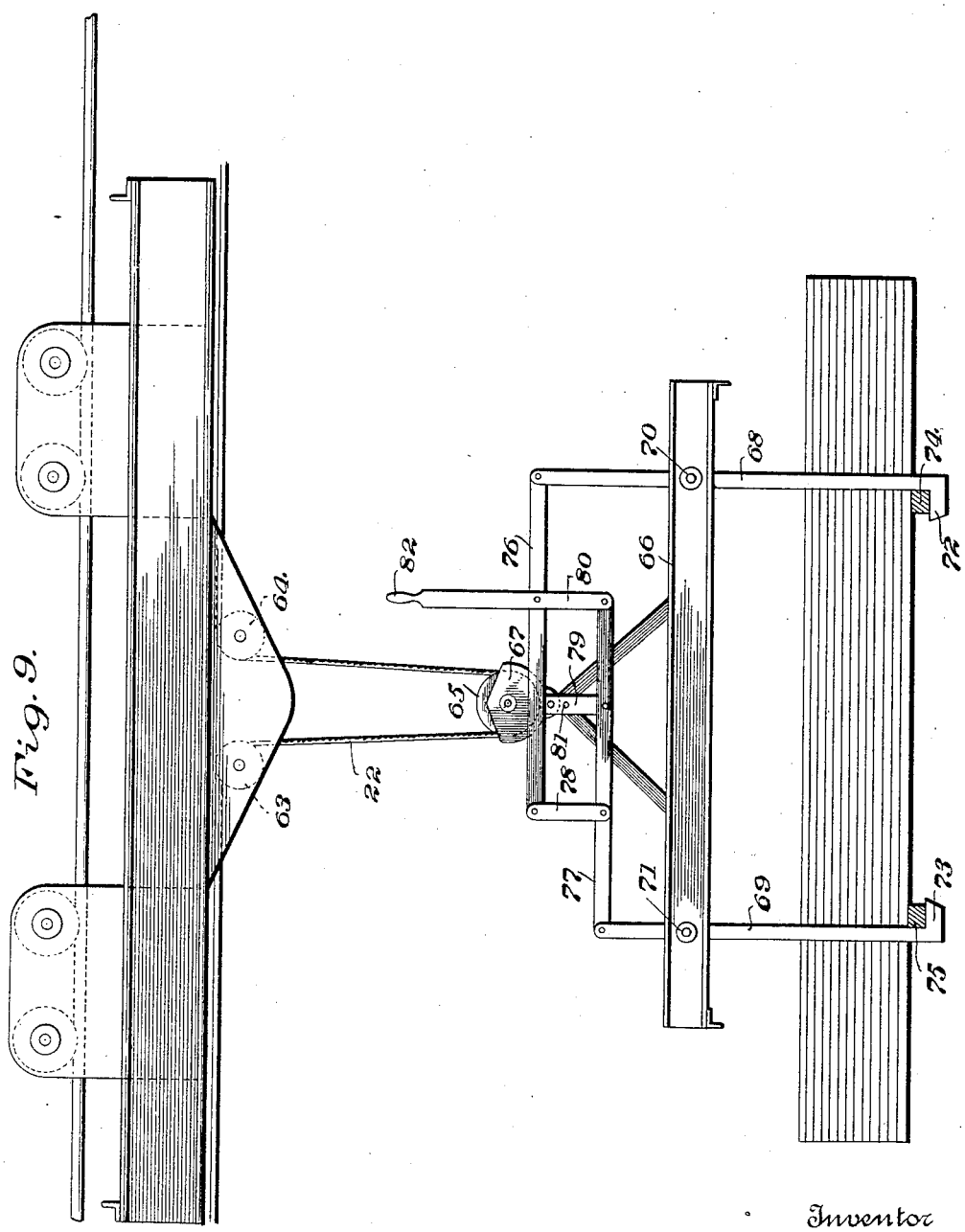

W. GRAHAM.
CONVEYER.
APPLICATION FILED OCT. 22, 1910.
1,039,730.
Patented Oct. 1, 1912.
9 SHEETS—SHEET 7.
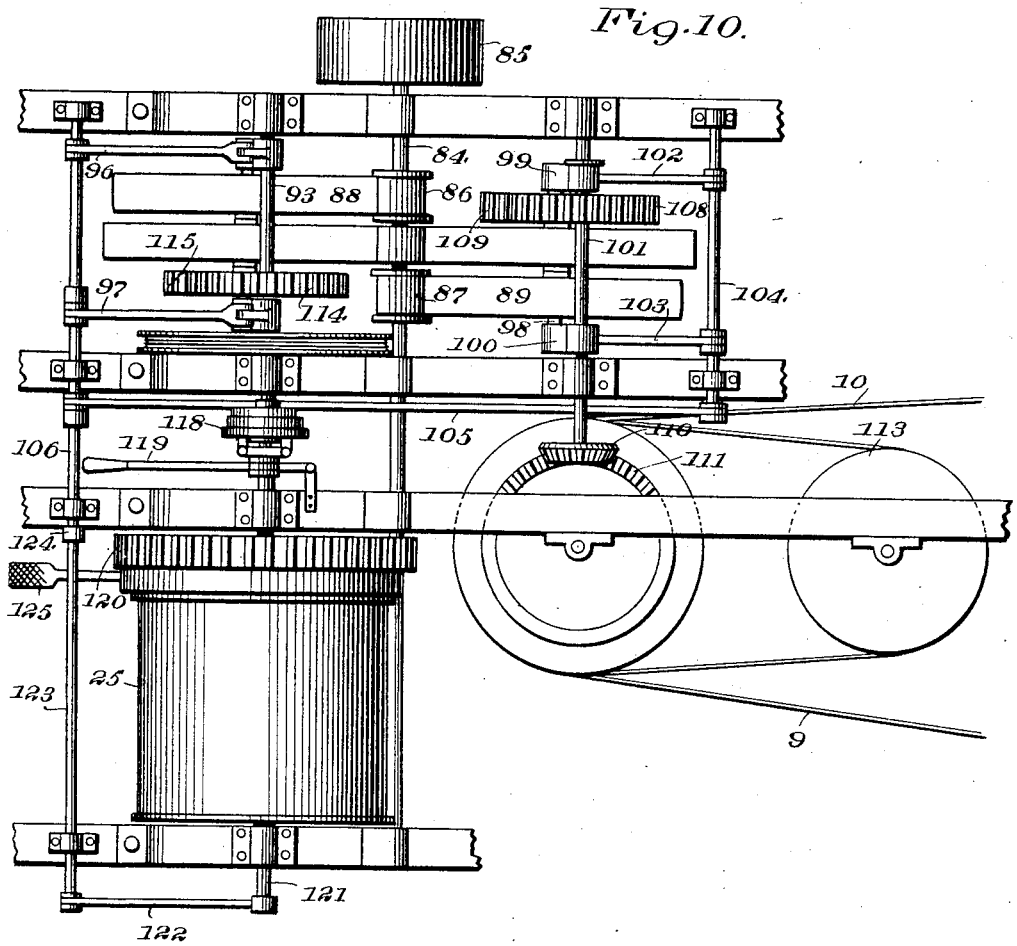
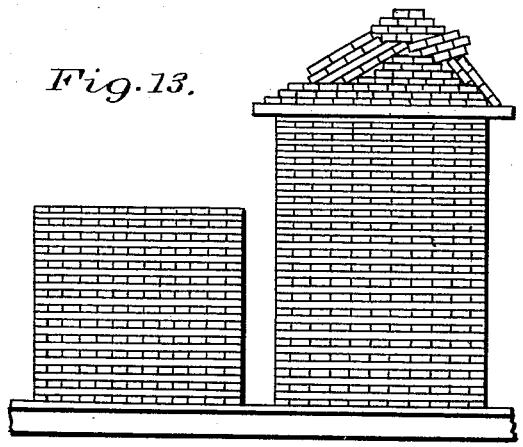

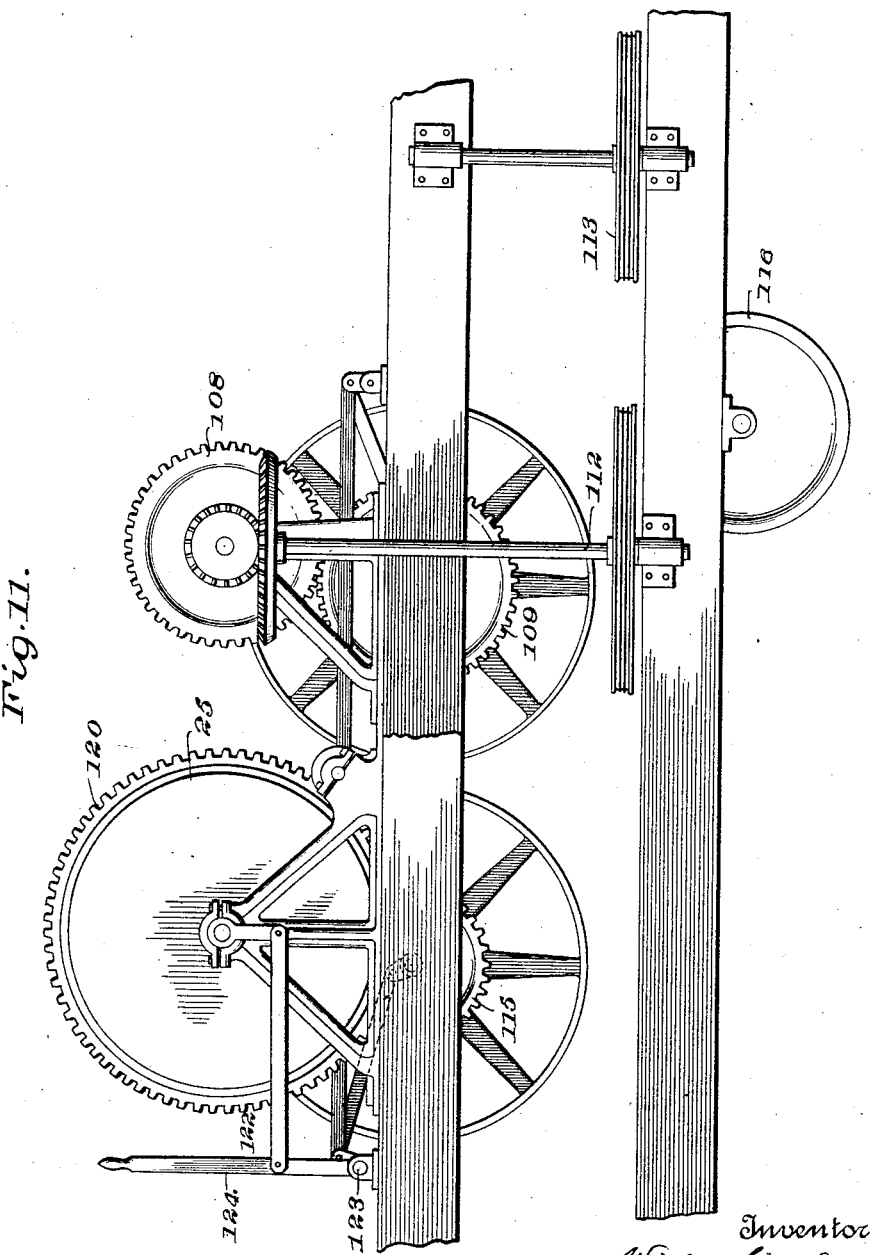

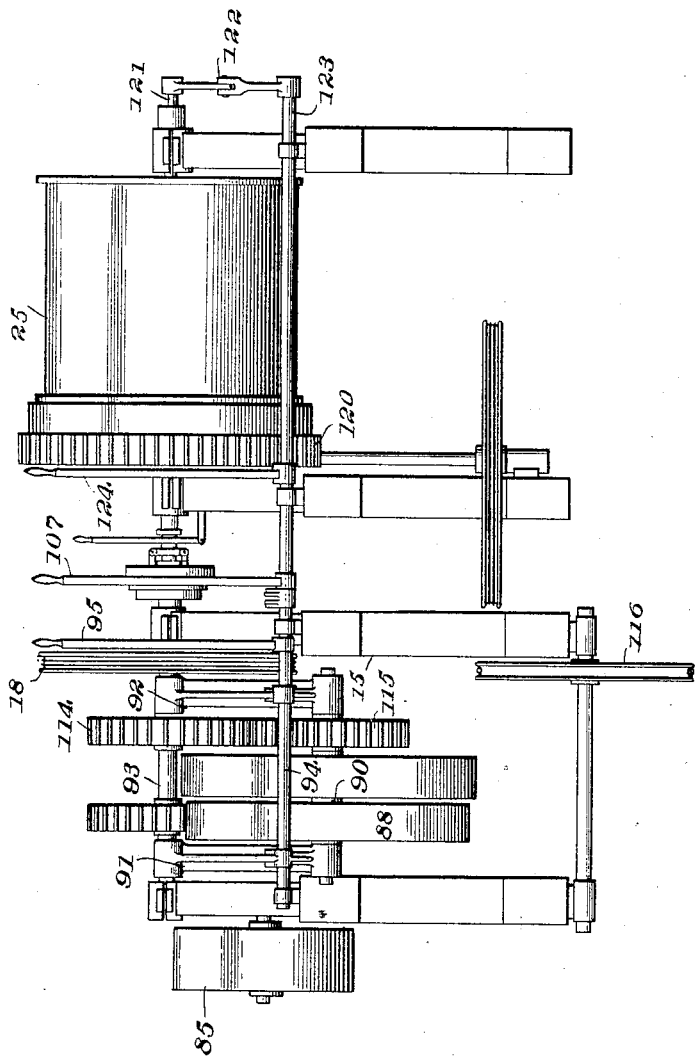

UNITED STATES PATENT OFFICE.

WILLIE GRAHAM, OF NEW ORLEANS, LOUISIANA.

CONVEYER.

1,039,730.

Specification of Letters Patent. Patented Oct. 1, 1912.

Application filed October 22, 1910. Serial No. 588,532.

*To all whom it may concern:*

Be it known that I, WILLIE GRAHAM, a citizen of the United States, and resident of New Orleans, in the parish of Orleans and State of Louisiana, have invented certain new and useful Improvements in Conveyers, of which the following is a specification.

This invention relates to conveyers adapted to handle various commodities within a radius of about three thousand feet, and is particularly adapted for use in lumber yards and quarries, and also for coke ovens and furnaces. I have shown the invention in use in a lumber yard, but it will be understood that most of its features are not limited to such use.

The novel features of the invention will be apparent from the following description taken in connection with the accompanying drawings.

In the drawings,—Figure 1 is a side elevation showing my invention applied to a lumber yard; Fig. 2 is a plan view; Fig. 3 is a cross section of lumber sheds which may be used in connection with my conveyer; Fig. 4 is a fragmentary view showing the means for operating the removable covers for the sheds; Fig. 5 is an enlarged detail sectional view showing the carriage to which my conveying cable is attached; Fig. 6 is a plan view of the construction shown in Fig. 5; Fig. 7 is a side view of one form of trolley car supporting one form of lumber carrier; Fig. 8 is an end view of the construction shown in Fig. 7; Fig. 9 is a side view of a modified form of trolley car and lumber carrier; Fig. 10 is a plan view of the operating mechanism; Fig. 11 is a side view of the construction shown in Fig. 10, looking in the direction of the arrow; Fig. 12 is an end view of the same construction at right angles to the view shown in Fig. 11; and Fig. 13 is an end view of stacks of lumber built up by the use of my mechanism.

Broadly considered, my invention embodies two supports between which a cable is stretched, and on which a trolley car moves for the purpose of conveying any articles to any point along the length of the cable, and one end of the cable is attached to a carriage moving on a semi-circular track drawn on the circle having the other end of the cable as its center so that one end of the cable may be shifted to deliver the articles at various points. It includes mechanism for moving the trolley car along the cable to the position desired, mechanism for lowering the load at any point, and mechanism for moving the carriage to which the movable end of the cable is attached, all of these mechanisms being operated from a point adjacent the fixed end of the cable.

As shown in Fig. 1, when applying my invention to a lumber yard I make use of the support 1 which is in the form of rigid framework, and the cable 2 is secured to the upper part of this frame or support at a fixed point, but in such a way that it may be tightened. The cable passes over the pulley 3, and is secured to the end of the screw-threaded rod 4 which may be moved to tighten the cable by means of the screw-threaded nut 5. The opposite end of the cable 2 is secured to the movable carriage 6 at the upper end of the support 7, which support is made up of the vertical and inclined posts, as well as the guy ropes 8. As shown in Fig. 2, the frame or support 7 is made semi-circular in form with the pulley 3 as its center, and it is provided with a track on which the carriage 6 moves. Cables 9 and 10 are secured to opposite sides of the carriage 6 and pass over pulleys 11, 12 at the ends of the track, and from those points to a pulley 13 carried by the framework 1 and operated as hereinafter described. By means of these cables 9 and 10, the carriage 6 may be moved to any point along the semi-circular track, so as to make the cable 2 extend along any radius of the semi-circular portion from one side to the other. The trolley car 14 is mounted on the cable 2 and is adapted to travel longitudinally thereof, cables 15 and 16 being secured to opposite sides of the car, and the cable 15 passing over a pulley 17 on the carriage 6 and back to an operating drum 18 carried by the framework 1 at the fixed end of the cable. The cable 15 passes over the pulley 19 on the support 1 and the cable 16 passes over the pulley 20, and thus these two cables are maintained in a position longitudinally of the main cable 2 at all times. In order to support the articles to be carried from the trolley car 14 I make use of any suitable form of carrier 21, which may be so constructed as to receive the particular material which is to be conveyed from one point to another. In the particular form shown in Fig. 1 the carrier is adapted to contain lumber, and it is supported from the carrier by a cable 22, permanently secured to the trolley car at one end, and passing around the pulley or roller 23 on the carrier over a roller 24 on a trolley car, and back over a roller on the frame 1 to an operating drum 25. By winding this cable 22 on the drum 25 the carrier 21 may be elevated to the position shown in Fig. 1, and as the cables 15 and 16 are moved inward to carry the trolley car forward, the drum carrying the cable 22 is rotated to unwind the cable, and since the drums 18 and 25 are of the same diameter they may be rotated together and at the same speed in order to move the load forward and at the same time hold it in elevated position. In distributing lumber with my device the frame 1 carrying the stationary end of the cable 2 is placed adjacent to an assorting device 26 in which lumber is separated into grades or sizes in bins from which it may be taken for the purpose of distribution to the lumber sheds by my conveying system. The particular assorting mechanism diagrammatically shown forms no part of the present invention, but is covered by another application filed by me.

In operation the trolley car 14 is brought to a position over the assorting mechanism, and the carrier 21 is then lowered to receive its load from one of the bins. It is then elevated and the cable 2 being brought to the position desired by the movement of the carriage 6 on its track, the trolley car is moved forward toward the support 7, until it is directly over the spot where it is desired to deposit the load of lumber, and the carrier is then lowered. As shown the lumber is stacked in piles 27, 28 and 29, these stacks being arranged in lines radiating from the fixed support for the cable 2. As illustrated in Fig. 13 I preferably build two stacks of lumber side by side, maintaining one higher than the other so that one may be used as a support for the load while stacking it on the other.

It is preferable to have lumber sheds over the various piles of lumber, and in Fig. 3 I have shown such sheds 30 and 31 which may be of ordinary construction, but which have movable covers, so as to permit the load of lumber to be lowered into the shed through the roof. The two sheds shown are constructed alike, and they have at their upper inner edges rollers 32 over which passes the tarpaulin roof or cover 33 which is provided at its edges with the bars 34, 35. Cables 36 are secured to the bar 34 at different points and pass over pulleys 37 at the outer upper edges, and over pulleys 38 at the lower edges of the shed, and extend from this point to a series of drums 39 carried by the shaft 40. The bar 35 is also connected by cables 41 to the drums 39, the winding of the cables 41 and 36 being reversed so that the rotation of the drums 39 will move the roof 33 in one direction or the other in order to bring it into position over the lumber shed, or into the open position, as shown in Fig. 3. The shaft 40 has on its end a beveled gear 42 which meshes with the beveled gear 43 on a cross shaft having a pinion engaged by the rack 44 on the end of the piston rod 45, which works in the steam cylinder 46, this cylinder being preferably placed horizontally at the bottom inner edge of the lumber sheds.

The track on which the carriage 6 moves is preferably composed, as shown in Fig. 5, of two curved rails 47, 48, which are parallel one above the other, and which face in a horizontal direction so as to bear the horizontal pull exerted by the cable 2. The carriage 6 has vertical spindles 49 carrying the upper and lower wheels 50, 51 which roll on the rails 47, 48, there being two pairs of wheels on the carriage for the purpose of steadiness. On the under surface of the carriage 6 there is a bracket 52, which carries the wheels 53 traveling on the rail 54, which constitutes the supporting track for the carriage. A link 55 constitutes the connection between the carriage and the cable 2.

The trolley car 14 preferably has at each end a housing 56 carrying a pair of rollers 57, 58, which travel on the cable 2, and in the form shown in Fig. 7 the roller 24 is secured at the central point between these two housings, being supported therefrom. In this form a housing 59 is secured to the pivot of the roller 23, and is connected by arms or cables 60 to a longitudinal bar to which is secured at the ends the chains 61, 62. These chains are adapted to be passed around a load of lumber, the ends of the chains being connected together by a releasable catch 63 which is of such construction that it will be released automatically when the load is let down into position, and the chain becomes slack.

While the form of carrier shown in Fig. 7 is adapted for transporting lumber, I prefer to use for this purpose the form of carrier illustrated in Fig. 9, and I also prefer to use the means for operating the elevating cable 22 shown in this figure. In this case, instead of securing one end of the cable 22 to the trolley car, I make use of two pulleys 63, 64 carried by the car, and the cable 22 passes freely over these two pulleys. One end of the cable is secured permanently to the carriage 6 and the other end goes to the drum 25 carried on the fixed support. That part of the cable between the pulleys 63, 64 passes beneath a pulley 65 which supports the carriage. By this construction when the drum 25 has been rotated sufficiently to elevate the carrier to the point desired, it is locked, and the cable 22 is held in fixed position while the trolley car is being moved from one position to another, and the carrier will thus be held up in elevated position until the drum 25 is reversed to allow the cable 22 to unwind. The trolley car and carrier simply travel along the cable 22, which cable moves over the pulleys 63, 64, and beneath the pulley 65 as the parts travel to the position desired. This arrangement has the advantage over that shown in Fig. 7 of making it unnecessary to have such a long cable to elevate and lower the load, and it avoids the necessity for operating the drum 25 in unison with the drum 18. In this form of the invention the carrier 66 is supported from the housing 67 carried by the shaft of the pulley 65, and instead of making use of chains to form a sling carrying the lumber, I make use of four arms 68, 69, which are pivoted at 70, 71, and which carry at their lower ends oppositely facing lugs or extensions 72, 73. These lugs 72, 73, are adapted to pass under the ends of the movable cross bars 74, 75, which may be placed beneath the lumber when it is brought together in the form of a load. The arms 68, 69 are pivotally connected at their upper ends to the horizontal bars 76, 77, which are parallel one above the other. These bars 76, 77 are connected by pivot links 78, 79 and 80, the link 79 having fixed pivotal connection 81 to the frame of the carrier, and the link 80, being extended upwardly in the form of a handle 82, for the purpose of operating the arms 68, 69 to release the lumber. It will be observed by the construction shown that if the arm 82 is moved to the left in Fig. 9, the lugs 72 and 73 will be moved outwardly from beneath the bars 74, 75, and thus the load will be released and the carrier may be elevated.

The mechanism for operating my conveyer is preferably controlled from a single point, giving a view of both the supply and the various points of delivery. In the form shown the operating mechanism is on a platform 83 on the support 1 which carries the fixed end of cable 2. This mechanism is shown in detail in Figs. 10, 11 and 12. The operating mechanism includes a shaft 84 having on its end a belt driven pulley 85 receiving its power from any suitable source. Two friction pulleys 86, 87 are mounted on this shaft and they are adapted to make contact with and to respectively turn the larger friction pulleys 88 and 89. The pulley 88 is mounted on a swinging shaft 90 carried by the link arms 91, 92 pivoted at their upper ends on the shaft 93, and thus the pulley may be moved into or out of contact with the pulley 86. The means for swinging the pulley 88 consists of a rock shaft 94 operated by handle 95 having link connections 96, 97 with arms 91, 92. The pulley 89 is mounted on a swinging shaft 98 carried by link arms 99, 100 pivoted at their upper ends to shaft 101, and the pulley is given its swinging motion into and out of operative position by links 102, 103 operated by rock shaft 104. The rocking movement is imparted to shaft 104 by link connection 105 between it and rock shaft 106, a handle 107 being provided adjacent handle 95 for the purpose. Shaft 101 has fixed to it a gear wheel 108 which meshes with the gear wheel 109 carried by the swinging shaft 98 and thus the shaft 101 is positively driven whenever the friction pulley 89 is in operative position. A bevel gear 110 is carried by shaft 101 and meshes with gear 111 on shaft 112 which carries at its lower end drum 13 for operating cables 9, 10. In connection with drum 13 I preferably make use of the tightening drum 113 over which the cable passes. The shaft 93 has the gear wheel 114 mounted thereon meshing with the gear wheel 115 carried by swinging shaft 90, and thus shaft 93 is positively driven when pulley 88 is in operative position. Winding drum 18 carrying cables 15, 16 is mounted on shaft 93 and I preferably make use of an adjustable tightening pulley or drum 116 which receives the cable which passes over drum 18. Shaft 93 is in alinement with shaft 117 which carries drum 25 on which the hoisting cable is wound, the two shafts being connected by an ordinary expansion friction clutch 118 operated by handle 119. The drum 25 has at its end a driving gear wheel 120 which may be connected to the drum by an ordinary interior expansion clutch which is operated by the shaft 121 which enters the end of the drum. The shaft 121 is turned by link arm 122 connected to the rock shaft 123 which is operated by handle 124. A friction brake surrounds drum 25 and is applied by foot lever 125 for the purpose of holding the drum so as to sustain or lower the load on hoisting cable 22, when the clutch connection for operating drum 25 is disconnected.

The drum 25 has the same diameter as drum 18 so that cable 22 will be paid out or drawn in at the same rate as cable 15, and thus the carrier 21 in Fig. 7 will be held up in the same relative position to the cable 2 as the carriage 14 moves along it. This fixed relation is maintained when the clutch 118 is in operative position and the shaft 117 is connected to rotate with shaft 93. In order to lower the load the clutch 118 is thrown out of operation and the friction brake is applied by pedal 125. It will be understood that the construction and means for operating drum 25 above described is applicable only to the form of carrier shown in Fig. 7 and that the construction may be much simpler for the preferred form shown in Fig. 9. In the form shown in Fig. 9 the hoisting cable is not paid out as the trolley car moves, but is held stationary and consequently it is not necessary to have such a large drum 25, and is not necessary to clutch the shaft of that drum to shaft 93.

It is believed that the operation of the device will be apparent to those skilled in the art from the above description. It will be observed that the trolley car is under the control of the operator standing on platform 83, and that it may be brought to a position over the assorter 26 for the purpose of receiving a load and may then be directed to any point within the limits of track upon which the carriage 6 moves. The carrier may be lowered to receive or deposit a load at any desired point.

Having thus described the invention, what is claimed is:

1. In a device of the class described, the combination with supports, of a supporting cable connecting said supports, a carriage traveling on said cable, and means operatively connected with one end of a support for laterally shifting the point of connection with one of said supports without releasing the tension on said cable.

2. In a device of the class described, the combination with two separated supports, of a cable under tension extending between said supports, movable means for connecting one end of said cable to one of said supports, a curved trackway on said support upon which said connecting means travels, and means connected with one end of the trackway for shifting said movable means.

3. In a device of the class described, the combination with a cable, of stationary means for holding one end of said cable, movable fastening means for the other end of said cable, a semi-circular track for said movable fastening means concentric with said stationary means, and means operatively connected with the end of the track for moving said movable fastening means on said track.

4. In a device of the class described, the combination with a cable, of stationary means for holding one end of said cable, a carriage provided with horizontal and vertical rollers to which the opposite end of said cable is secured, and an elevated semicircular track for the rollers and upon which said carriage runs concentric with said stationary holding means.

5. In a device of the class described, the combination with a cable, of stationary means for holding one end of said cable, a carriage provided with rollers to which the opposite end of said cable is secured, an elevated semi-circular track upon which said carriage runs concentric with said stationary holding means, and means connected with the ends of the track for moving said carriage on said track.

6. In a device of the class described, the combination with a cable, of stationary means for holding one end of said cable, a carriage provided with rollers to which the opposite end of said cable is secured, an elevated semi-circular track upon which said carriage runs concentric with said stationary holding means, and cables extending from said carriage to the ends of said track and from there to a point adjacent the stationary holding means for the purpose of moving said carriage on said track.

7. In a device of the class described, the combination with a supporting cable, of stationary means for holding one end of said cable, movable fastening means for the other end of said cable, a semi-circular track for said movable fastening means concentric with said stationary means, a car traveling on said cable, a pulley on said movable fastening means, and a cable passing over said pulley and beneath the supporting cable for operating said car.

8. In a device of the class described, the combination with a supporting cable under tension, of means for shifting one end of the cable laterally without releasing the tension, a trolley car movable on said cable, means beneath the cable for moving said car, a carrier supported by said car, a hoisting cable connecting said carrier and car, and extending to the end of said supporting cable, means for maintaining said hoisting cable in such position as to hold said carrier in elevated position as the car moves, and means at the fixed end of said supporting cable for operating all of said parts.

9. In a device of the class described, the combination with a supporting cable under tension, of a trolley car movable on said cable, means at one end of said cable for operating said car, a carrier supported by said car, a hoisting cable connecting said carriage and car, and extending to the end of said supporting cable, means for operating said hoisting cable to raise and lower said carriage, and frictionally actuated means for maintaining said hoisting cable in such position as to hold said carrier in elevated position as the car moves.

10. The combination with supports of a supporting cable, a car movable thereon, means connected with the end of one of said supports for moving said cable and car laterally, a carrier, a hoisting cable extending along said supporting cable, means for securing the ends of said hoisting cable, two pulleys on said car over which said hoisting cable passes forming a loop, a pulley on said carrier engaged by said loop, means for winding the end of said hoisting cable to raise said carrier, means for releasing said winding means, and a friction brake for lowering said carrier.

11. The combination with a supporting track, of means for shifting one end of said track laterally, a car movable on said track, means for moving said car, a carrier supported by said car, a hoisting cable for said carrier, and means at the fixed end of said track for operating all of said parts.

12. The combination with a supporting cable, of a fixed support for one end thereof, a semi-circular track for the opposite end embodying horizontal tension rails, and a vertical supporting rail, a carriage having horizontal and vertical rollers fitting said rails, and means for connecting said cable to said carriage.

13. The combination with a supporting cable, of a fixed support for one end thereof, a semi-circular track for the opposite end embodying two horizontally facing rails and an upwardly facing rail in advance of said horizontal rails, a carriage extending between said horizontal rails, horizontal rollers on said carriage bearing on said rails, vertical rollers bearing on said upwardly facing rail, and means for connecting said cable to said carriage.

14. The combination with a supporting cable, of a fixed support for one end thereof, a semi-circular track for the opposite end embodying horizontal tension rails and a vertical supporting rail, a carriage having horizontal and vertical rollers fitting said rails, means for connecting said cable to said carriage, rollers at the ends of said track, and an operating cable secured to said carriage and passing over said end rollers.

In testimony whereof I affix my signature in presence of two witnesses.

WILLIE GRAHAM.

Witnesses:
EDWARD HARE,
FLORENCE FLYNN.

Copies of this patent may be obtained for five cents each, by addressing the "Commissioner of Patents, Washington, D. C."